(12) United States Patent
Kitani

(10) Patent No.: US 9,459,502 B2
(45) Date of Patent: Oct. 4, 2016

(54) LIQUID CRYSTAL DISPLAY DEVICE

(71) Applicant: Japan Display Inc., Minato-ku (JP)

(72) Inventor: Masakatsu Kitani, Tokyo (JP)

(73) Assignee: Japan Display Inc., Minato-ku (JP)

( * ) Notice: Subject to any disclaimer, the term of this patent is extended or adjusted under 35 U.S.C. 154(b) by 100 days.

(21) Appl. No.: 14/264,321

(22) Filed: Apr. 29, 2014

(65) Prior Publication Data

US 2014/0347584 A1 Nov. 27, 2014

(30) Foreign Application Priority Data

May 27, 2013 (JP) .................................. 2013-110942

(51) Int. Cl.
*G02F 1/1362* (2006.01)
*G02F 1/1335* (2006.01)

(52) U.S. Cl.
CPC ... *G02F 1/136209* (2013.01); *G02F 1/133512* (2013.01); *G02F 1/136286* (2013.01)

(58) Field of Classification Search
CPC .................. G02F 1/136209; G02F 1/136286; G02F 1/133512
See application file for complete search history.

(56) References Cited

U.S. PATENT DOCUMENTS

| | | | | |
|---|---|---|---|---|
| 6,674,495 B1 * | 1/2004 | Hong et al. | ...................... | 349/43 |
| 6,724,513 B2 * | 4/2004 | Murade | ................... | H01L 27/12 257/E27.111 |
| 2008/0024712 A1 * | 1/2008 | Kim | .............................. | 349/144 |
| 2011/0304785 A1 * | 12/2011 | Ge et al. | ......................... | 349/33 |

FOREIGN PATENT DOCUMENTS

| | | |
|---|---|---|
| CN | 101114656 A | 1/2008 |
| CN | 102934015 A | 2/2013 |
| JP | 6-84946 A | 3/1994 |
| JP | 2000-10120 | 1/2000 |
| JP | 2008-191470 | 8/2008 |
| JP | 2008-197359 | 8/2008 |
| JP | 2012-108392 A | 6/2012 |
| KR | 1999-0048095 A | 7/1999 |
| TW | 533325 B | 5/2003 |
| TW | 200521597 A | 7/2005 |
| TW | 200525219 A | 8/2005 |
| TW | 200528823 A | 9/2005 |

OTHER PUBLICATIONS

Combined Office Action and Search Report issued on Oct. 23, 2015 in Taiwanese Patent Application No. 103116884 with English translation.
Notification for Filing Opinion issued Jul. 17, 2015 in Korean Patent Application No. 10-2014-0061353 (with English language translation).

* cited by examiner

*Primary Examiner* — Richard Kim
*Assistant Examiner* — Kendrick Hsu
(74) *Attorney, Agent, or Firm* — Oblon, McClelland, Maier & Neustadt, L.L.P

(57) ABSTRACT

According to one embodiment, liquid crystal display device includes an array substrate, a counter substrate, and a liquid crystal layer. The array substrate includes a plurality of pixel electrodes, a plurality of gate lines, a plurality of source lines, a plurality of switching elements, and a plurality of light shielding layers. Each of the light shielding layers extends to cross, among the source lines, even-numbered source lines arranged in the direction of the extension of the gate lines.

8 Claims, 6 Drawing Sheets

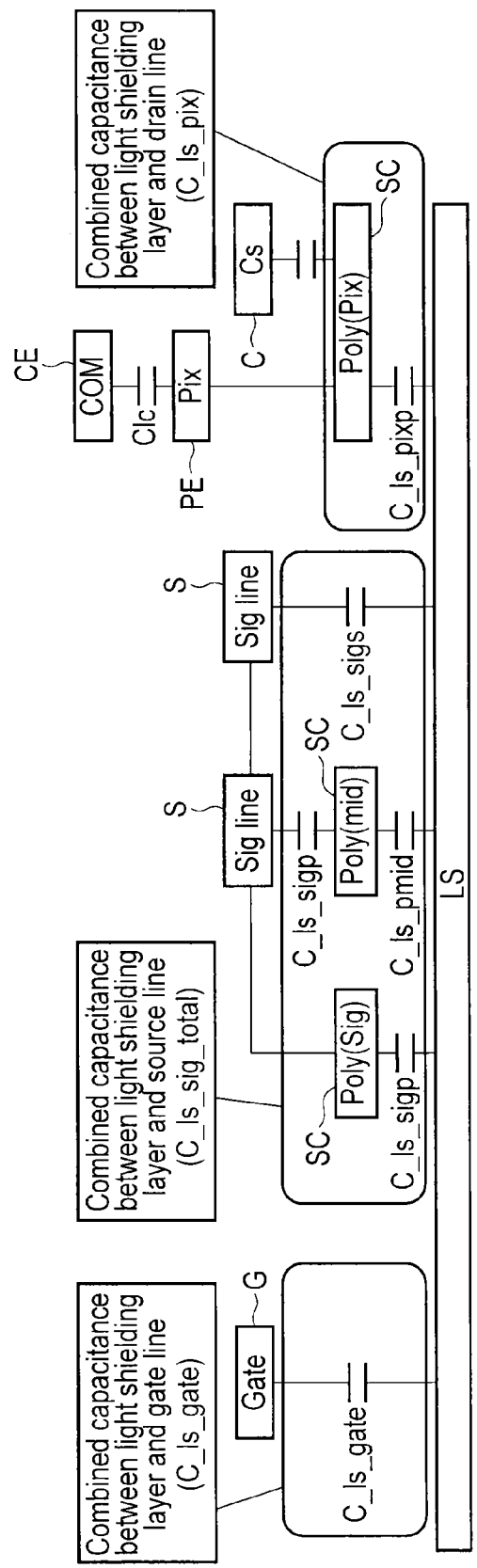
F I G. 5

LIQUID CRYSTAL DISPLAY DEVICE

CROSS-REFERENCE TO RELATED APPLICATIONS

This application is based upon and claims the benefit of priority from Japanese Patent Application No. 2013-110942, filed May 27, 2013, the entire contents of which are incorporated herein by reference.

FIELD

Embodiments described herein relate generally to a liquid crystal display device.

BACKGROUND

In recent years, flat-panel display devices have been under intense development, and in particular, liquid crystal display devices have become the mainstream of development because they are light, thin, and low in energy consumption, making them ideal for installing in various electronic apparatuses.

An active matrix type liquid crystal display device includes an active area provided with pixels arranged in a matrix form. The active area includes gate lines extending along rows of the arranged pixels, source lines extending along columns of the arranged pixels, and switching elements disposed in proximity to positions where the source lines and gate lines are crossing.

The liquid crystal display device performs, for example, an alternating electric field drive which inverts the polarity of voltage applied to liquid crystal frame by frame. For example, a column inversion drive scheme shows a polarity pattern in which the polarity is inverted column by column those are along the source lines in each frame, and a dot inversion drive scheme shows a polarity pattern in which pixels having different polarities are arranged in a checkered pattern in each frame.

BRIEF DESCRIPTION OF THE DRAWINGS

FIG. 5 is a view illustrating an example of capacitance occurring between the light shielding layer, gate line, source line, and drain line.

DETAILED DESCRIPTION

In general, according to one embodiment, there is provided a liquid crystal display device, comprising: an array substrate comprising a plurality of pixel electrodes arranged in a matrix form, a plurality of gate lines extending along rows in which the plurality of pixel electrodes are arranged, a plurality of source lines extending along columns in which the plurality of pixel electrodes are arranged, a plurality of switching elements, and a plurality of light shielding layers, and each of the switching elements being disposed in proximity to a position where one of the gate lines and one of the source lines cross each other, and the light shielding layers being arranged at an underlayer of the switching elements; a counter substrate comprising a common electrode opposite to the pixel electrodes; and a liquid crystal layer held between the array substrate and the counter substrate. Each of the light shielding layers extends to cross, among the source lines, even-numbered source lines arranged in a direction of extension of the gate lines.

Hereinafter, a liquid crystal display device of an embodiment is described in detail with reference to the drawings.

Figure 1:
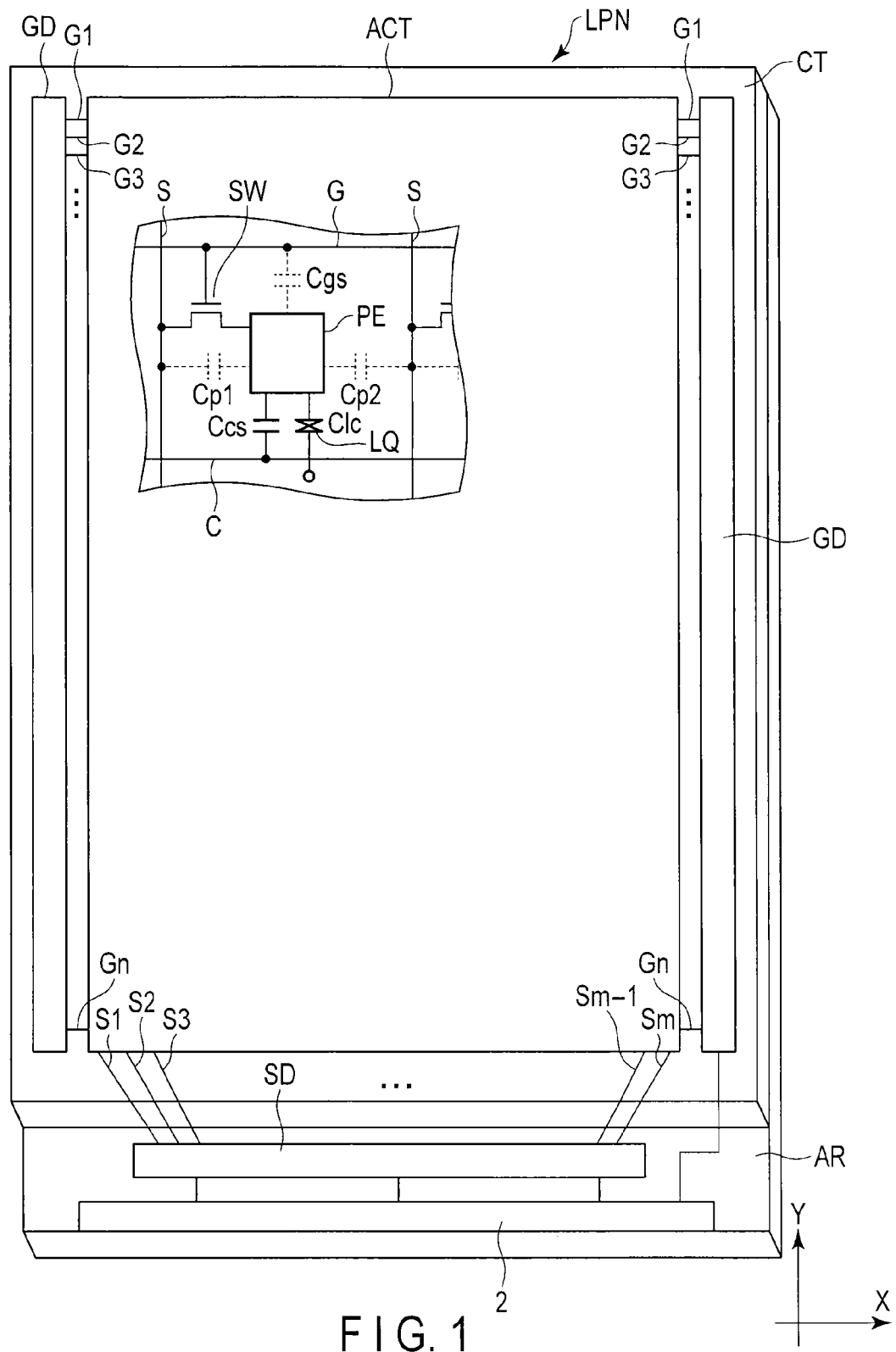
FIG. 1 is a view schematically illustrating one of structural examples of a liquid crystal display device according to an embodiment.

FIG. 1 is a view schematically illustrating a structural example of the liquid crystal display device of the present embodiment.

The liquid crystal display device comprises an active matrix type liquid crystal display panel LPN. The liquid crystal display panel LPN comprises an array substrate AR which is a first substrate, a counter substrate which is a second substrate disposed opposite to the array substrate AR, and a liquid crystal layer LQ held between the array substrate AR and the counter substrate CT. The liquid crystal display panel LPN comprises an active area ACT which displays an image. The active area ACT is structured by a plurality of pixels arranged in an m×n matrix (where m and n are positive integers).

The liquid crystal display panel LPN comprises, in the active area ACT, n gate lines G (G1 to Gn), n storage capacitance lines C (C1 to Cn), and m source lines S (S1 to Sm). The gate lines G and the storage capacitance lines C extend, for example, substantially linearly in a first direction X. The gate lines G and the storage capacitance lines C are arranged alternately in parallel with a second direction Y crossing the first direction X. Here, the first direction X and the second direction Y are substantially orthogonal to each other. The source lines S cross the gate lines G and the storage capacitance lines C. The source lines S extend substantially linearly in the second direction Y. Note that the gate lines G, storage capacitance lines C and source lines S are not necessarily extend linearly, and may partly bend or curve.

Each of the gate lines G is pulled outside the active area ACT and is connected to a gate driver GD. Each of the source lines S is pulled outside the active area ACT and is connected to a source driver SD. At least a part of both the gate driver GD and the source driver SD is formed on, for example, the array substrate AR in contact with a driving IC chip 2 storing a controller.

Each pixel PX comprises a switching element SW, pixel electrode PE, common electrode CE, and the like. Storage capacitance Ccs is formed, for example, between the storage capacitance line C and a drain line (semiconductor layer) of the switching element SW. The storage capacitance line C is electrically connected to a voltage applied part (which is not shown) to which storage capacitance voltage is applied.

Note that, in the embodiment, the pixel electrode PE is formed on the array substrate AR while the common electrode CE on the counter substrate CT. The liquid crystal display panel LPN uses mainly an electric field formed between the pixel electrode PE and the common electrode CE for switching liquid crystal molecules of the liquid crystal layer LQ.

The switching element SW is structured by, for example, an n-channel thin film transistor (TFT). The switching element SW is electrically connected to the gate lines G and the source lines S. The switching element may be of either a top gate type or a bottom gate type. The semiconductor layer of the switching element SW is formed of, for example, a polysilicon here, but may be formed of an amorphous silicon.

The pixel electrode PE is disposed in each pixel PX and is electrically connected to the switching element SW. The common electrode CE is arranged to be common with the pixel electrodes PE of pixels PX via the liquid crystal layer LQ. The pixel electrode PE and the common electrode CE are formed of a transparent electrode material such as indium tin oxide (ITO) and indium zinc oxide (IZO), but may be instead formed of other metal materials such as aluminum and the like.

The array substrate AR comprises a feeder (which is not shown) which feeds voltage to the common electrode CE. The feeder is formed, for example, outside the active area ACT. The common electrode CE is pulled outside the active area ACT and is electrically connected to the feeder via a conductive member which is not shown.

Figure 2:
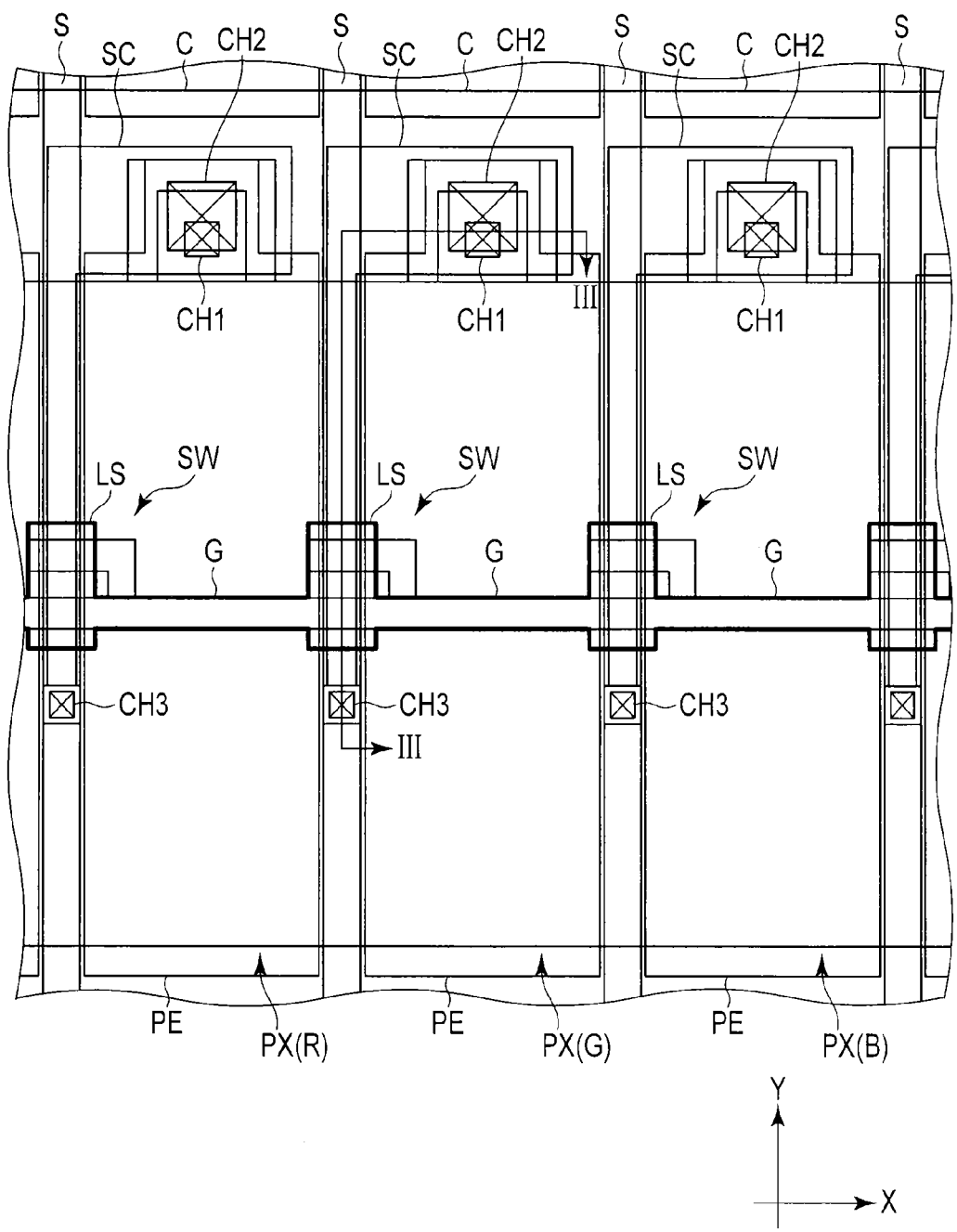
FIG. 2 is a plane view schematically illustrating a structural example of an active area of the liquid crystal display device of the embodiment.

FIG. 2 is a plane view schematically illustrating a structural example of a pixel PX of the liquid crystal display panel LPN shown in FIG. 1 viewed from the counter substrate side. The plane view here is on the X-Y plane.

The pixel PX shown in FIG. 2 is in a rectangular shape whose side in the first direction X is shorter than its side in the second direction Y. If the liquid crystal display panel is of a color display type, the pixels PX include plural kinds of color pixels. In the embodiment, the pixels PX include, for example, a red pixel PX(R), green pixel PX(G), and blue pixel PX(B). The color pixels are aligned in the direction of the extension of the source line S. The plural kinds of color pixels are arranged periodically in the direction of the extension of the gate line G.

The gate line G extends in the first direction X. The storage capacitance line C extends in the first direction X with the gate line G interposed therebetween. The source line S extends in the second direction Y. The pixel electrode PE is disposed between adjacent source lines S. Furthermore, the pixel electrode PE is disposed between adjacent storage capacitance lines C.

The source line S is laid across the boundary between pixels PX adjacent in the first direction X. Furthermore, the gate line G is disposed at substantially the center of the second direction Y of the pixel PX. The storage capacitance line C is laid across the boundary between pixels PX adjacent in the second direction Y.

The switching element SW is electrically connected to the gate line G and the source line S in the example shown in FIG. 2. The switching element SW is disposed at a crossing point of the gate line G and the source line S, and the drain line SC extends along the source line S and the storage capacitance line C, and is electrically connected to the pixel electrode PE through contact holes CH1 and CH2 formed in a region overlapping the storage capacitance line C. The switching element SW is provided within and hardly goes out of the region overlapping the source line S and the storage capacitance line C, and thus, suppresses reduction of an opening area used for display.

At an underlayer of the switching element SW, a light shielding layer LS is disposed. The light shielding layer LS is disposed to face the crossing point of the gate line G and the source line S, and extends in the first direction X at an underlayer of the gate line G. Furthermore, as described below, the light shielding layer LS is laid over at least even-numbered pixels PX adjacent in the first direction X. The light shielding layer LS is disposed to face the gate line G.

Figure 3:
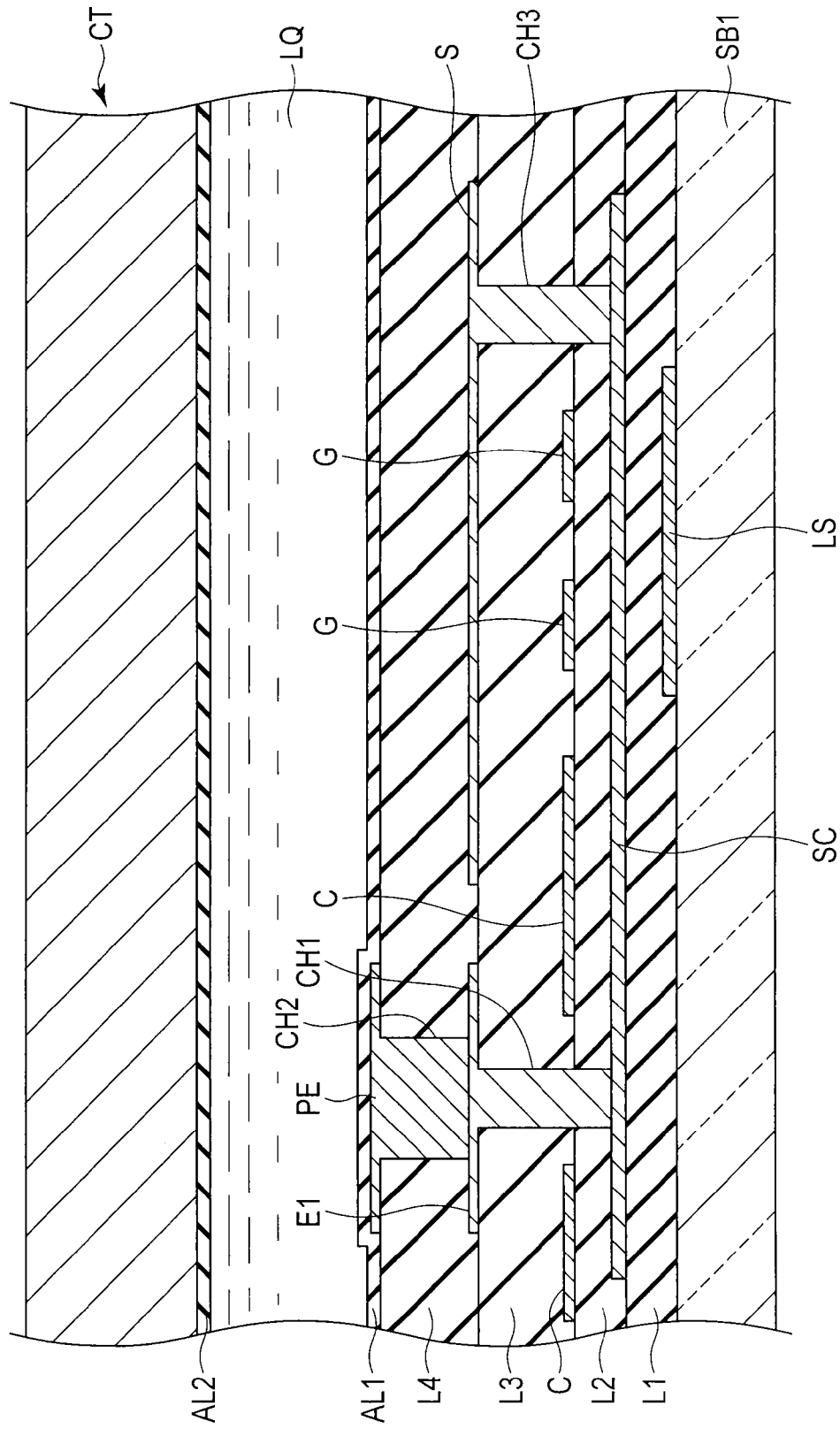
FIG. 3 is a cross-sectional view schematically illustrating a cross-sectional structure of the liquid crystal display panel shown in FIG. 2, taken along line

FIG. 3 is a cross-sectional view schematically illustrating a cross-sectional structure of the liquid crystal display panel, taken along line III-III shown in FIG. 2.

The array substrate AR comprises a transparent insulating substrate SB1, light shielding layer LS, drain line SC, gate line G, storage capacitance line C, source line S, contact electrode E1, pixel electrode PE, and first alignment film AL1.

The light shielding layer LS is disposed on the transparent insulating substrate SB1 and covered with a first interlayer insulating film L1.

The drain line SC is disposed on the first interlayer insulating film L1 and covered with a second interlayer insulating film L2. The drain line SC is formed of a semiconductor such as polysilicon or amorphous silicon or the like.

The gate line G and storage capacitance line C are disposed on the second interlayer insulating film L2 and is covered with a third interlayer insulating film L3. The gate line G is disposed above the light shielding layer LS and diverges to cross the drain line SC at two points. The storage capacitance line C is disposed opposite to the drain line SC via the second interlayer insulating film L2 so as to form storage capacitance between the storage capacitance line C and the drain line SC. The storage capacitance line C is partly removed over the drain line SC.

The source line S and the contact electrode E1 are disposed on the third interlayer insulating film L3 and covered with a fourth interlayer insulating film L4. The source line S is electrically connected with one side portion of the drain line SC by a contact hole CH3 provided through the second interlayer insulating film L2 and the third interlayer insulating film L3. The contact electrode E1 is electrically connected with other side portion of the drain line SC by a contact hole CH1 provided through the second interlayer insulating film L2 and the third interlayer insulating film L3.

The pixel electrode PE is disposed on the fourth interlayer insulating film L4 and covered with the first alignment film AL1. The pixel electrode PE is electrically connected to the contact electrode E1 through a contact hole CH2 provided the fourth interlayer insulating film L4. That is, the pixel electrode PE is electrically connected to the drain line SC via the contact electrode E1.

The counter substrate CT comprises a transparent insulating substrate (which is not shown), black matrix (which is not shown), color filter (which is not shown), common electrode (which is not shown), and second alignment film AL2.

The color filter comprises a red coloring layer (which is not shown) disposed on the red pixel PX(R), green coloring layer (which is not shown) disposed on the green pixel PX(G), and blue coloring layer (which is not shown) disposed on the blue pixel PX(B). A black matrix is disposed at a boundary between adjacent coloring layers.

The second alignment film AL2 covers the surface of the counter substrate CT and opposes to the first alignment film AL1.

Figure 4:
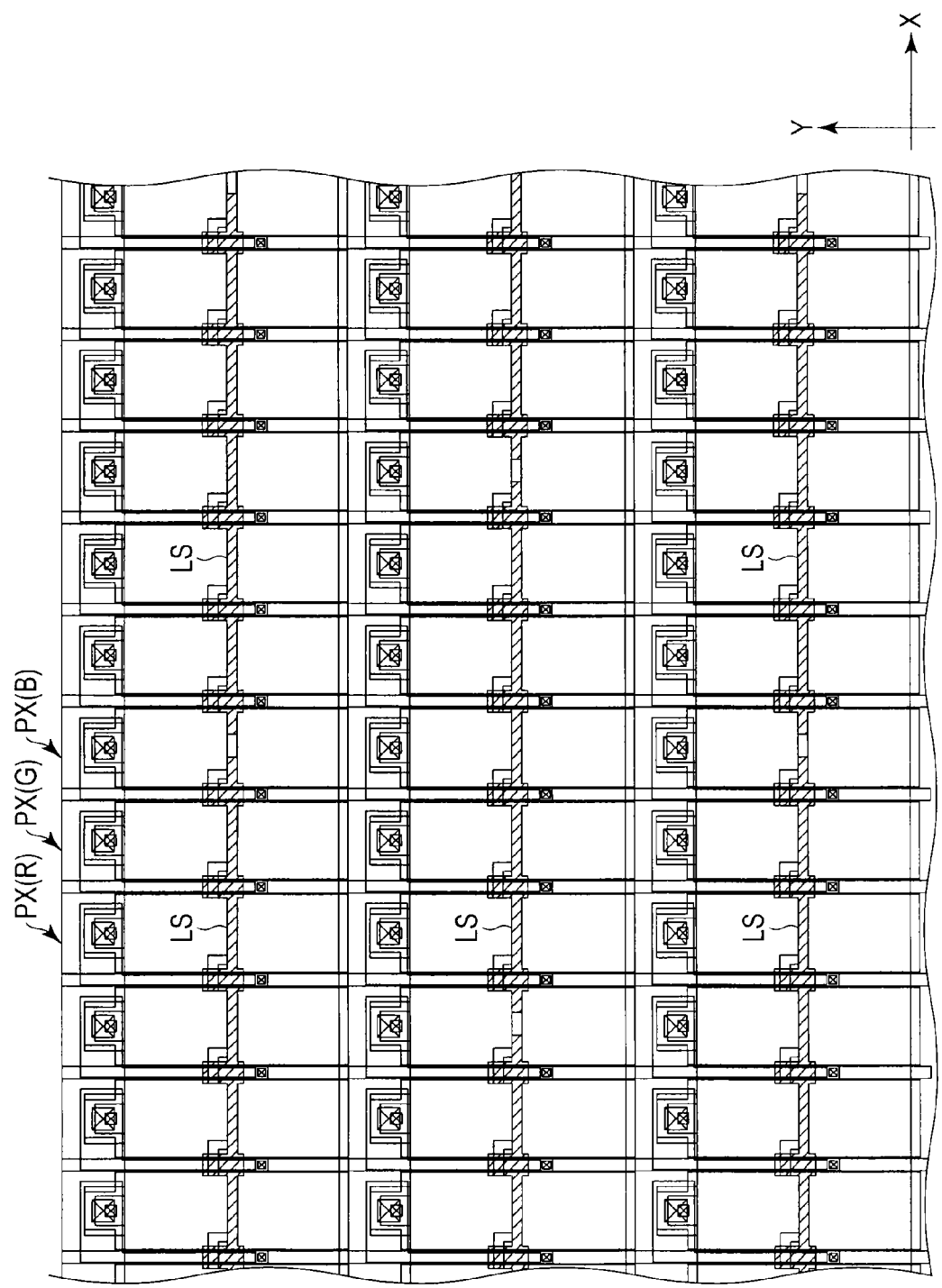
FIG. 4 is a view illustrating how light shielding layers are disposed in a part of the active area.

FIG. 4 is a view illustrating how the light shielding layers LS are disposed in a part of the active area ACT.

The light shielding layer LS is disposed over even-numbered pixels PX arranged in the direction of the extension of the gate line G and crosses even-numbered source lines S. If the liquid crystal display device is of a color display type, it is desired that the light shielding layer LS is disposed over the pixels PX of the even-numbered periods in the coloring layers of the color filters arranged periodically. In that case, the light shielding layer LS is disposed over the area opposed to the even-numbered periods in the plural kinds of coloring layers and crosses the even-numbered source lines S. Here, the plural kinds of coloring layers may be interpreted as coloring layers of a plurality of colors. Therefore, when the red coloring layer, green coloring layer, and blue coloring layer are arranged periodically in the first direction X, the light shielding layer LS is disposed over at least six pixels PX arranged in the first direction X.

That is, the source lines S (S1 to Sm) comprise source lines (first source lines) to which positive polarity signal is applied during a predetermined horizontal period of each frame and source lines (second source lines) to which negative polarity signal is applied during the same period. The even-numbered source lines S on which each of light shielding layer LS crosses include the same number of the first and second source lines. Here, for example, when the column inversion drive scheme is employed, the first source lines and the second source lines switch at each frame, and when the dot inversion drive scheme is employed, the first source lines and the second source lines switch at each horizontal period.

Furthermore, in two rows of the pixels PX adjacent in the direction of the extension of the source line S, the end portions of the light shielding layers LS are disposed at different positions in the direction of the extension of the gate line G. That is, a plurality of light shielding layers LS are arranged at first intervals in the first direction X and arranged at second intervals in the second direction Y. Among the plurality of light shielding layers LS, end portions of the light shielding layers adjacent to the second direction Y are shifted from each other in the first direction X. In other words, the end portions of the light shielding layers LS are arranged not to be adjacent to each other in the second direction Y.

With the light shielding layers LS arranged as above, even when a potential variation occurs in the source lines S, a potential variation of the positive polarity signal and a potential variation of the negative polarity signal are superposed on each other in the light shielding layer LS, and thus, the potential variations are offset to some extent and reduced.

Hereinafter, explained is an example of a mechanism for varying liquid crystal capacitance Clc via the light shielding layers LS.

FIG. 5 is a view illustrating an example of the capacitance occurring between the light shielding layer LS, gate line G, source line S, and drain line SC.

In each pixel PX, various kinds of capacitances occur and namely as shown in FIG. 1, liquid crystal capacitance Clc occurs between the pixel electrode PE and the common electrode CE, storage capacitance Ccs occurs between the storage capacitance line C and the drain line SC, parasitic capacitance Cp1 occurs between the pixel electrode PE and the self-source line S, parasitic capacitance Cp2 occurs between the pixel electrode PE and adjacent source line S, and parasitic capacitance Cgs occurs between the pixel electrode PE and the gate line G.

Note that the self-source line S is electrically connected to the pixel electrode PE via the switching element SW, and the adjacent source line S is not electrically connected to the pixel electrode PE connecting the self-source line S.

Here, the potential of the pixel electrode PE may vary depending on the potential variation of the source line S and the potential variation of the gate line G via the light shielding layer LS. What is explained below is combined capacitance $C\_ls\_gate$ between the light shielding layer LS and the gate line G, combined capacitance $C\_ls\_sig\_total$ between the light shielding layer LS and source line S, and combined capacitance C is pix between the light shielding layer LS and the drain line SC. Note that the description with reference to FIG. 5 is presented given that the light shielding layer LS is disposed independently only on the underlayer of the switching element SW of one pixel.

The combined capacitance $C\_ls\_gate$ varies depending on the potential variation of the gate line G; however, the potential of the gate line G is substantially constant during the period when the potential of the pixel electrode PE is being held. Thus, the combined capacitance C is gate has little effect on the liquid crystal capacitance Clc.

The combined capacitance $C\_ls\_sig\_total$ varies depending on the potential variation of the source line S and the potential of the light shielding layer LS varies based on the combined capacitance $C\_ls\_sig\_total$. When the potential variation of the light shielding layer LS is given $\Delta Vls$ and the potential variation of the source line S is given $\Delta Vsig$, the potential variation $\Delta Vls$ can be derived from the following equation.

$$\Delta Vls = (C\_ls\_sig\_total / Cls\_total) \times \Delta Vsig$$

Here, $$Cls\_total = C\_ls\_gate + C\_ls\_sig\_total + C\_ls\_pix$$

If the potential of the light shielding layer LS varies during the period when the liquid crystal capacitance Clc is being held, the potential of the drain line SC varies based on the combined capacitance $C\_ls\_pix$ (parasitic capacitance). Since the drain line SC is electrically connected to the pixel electrode PE, the potential of the pixel electrode PE varies depending on the potential variation of the drain line SC. The potential variation $\Delta Vpix$ of the pixel electrode PE can be derived by the following equation.

$$\Delta Vpix = (C\_ls\_pix / Ctotal) \times \Delta Vls$$

Here, $$Ctotal = Ccs + Clc + Cgs + Cp1 + Cp2$$

Note that the potential variation $\Delta Vls$ of the source line S reverses in sign depending on the signal applied to the source line S: the positive polarity signal or the negative polarity signal. That is, because the light shielding layer LS is disposed to cross both the source line S to which the positive polarity signal is applied and the source line S to which the negative polarity signal is applied, the potential variation $\Delta Vls$ of the source line S with respect to each light shielding layer LS is reduced by the offset between the positive electrode side and the negative electrode side, and consequently, the potential variation $\Delta Vpix$ of the pixel electrode PE can be reduced as well.

In the present embodiment, the light shielding layer LS is arranged at the six pixels PX adjacent in the direction of the extension of the gate line G, or more specifically, is arranged at the underlayer of the six switching elements SW and the gate line G which controls the gate potential of these switching elements SW. Therefore, each light shielding layer LS crosses the six source lines S adjacent in the first direction X, and the potential of the light shielding layer LS varies depending on the sum of the potential variation $\Delta Vls$ of the six source lines S adjacent in the first direction X.

For example, if the column inversion drive scheme or the dot inversion drive scheme is employed as a polarity inversion scheme of the liquid crystal display panel LPN, signals of different polarity are applied to the source lines S adjacent in the first direction X during the predetermined horizontal period of each frame. Therefore, the potential variation of the light shielding layer LS can be suppressed because the potential variation $\Delta Vls$ of the three source lines S to which the positive polarity signal is applied and the potential variation $\Delta Vls$ of the three source lines S to which the negative polarity signal is applied are offset each other. Consequently, the variation in the liquid crystal capacitance Clc caused by the potential variation of the light shielding layer LS is suppressed and the deterioration in display quality can be avoided.

Furthermore, in the embodiment, the end portions of the light shielding layers LS are arranged not to be adjacent in the second direction Y. Therefore, linear-shaped non-uniformity in display occurring due to the potential variations of adjacent light shielding layers LS can be avoided in proximity to the boundary between the adjacent light shielding layers LS.

Figure 6:
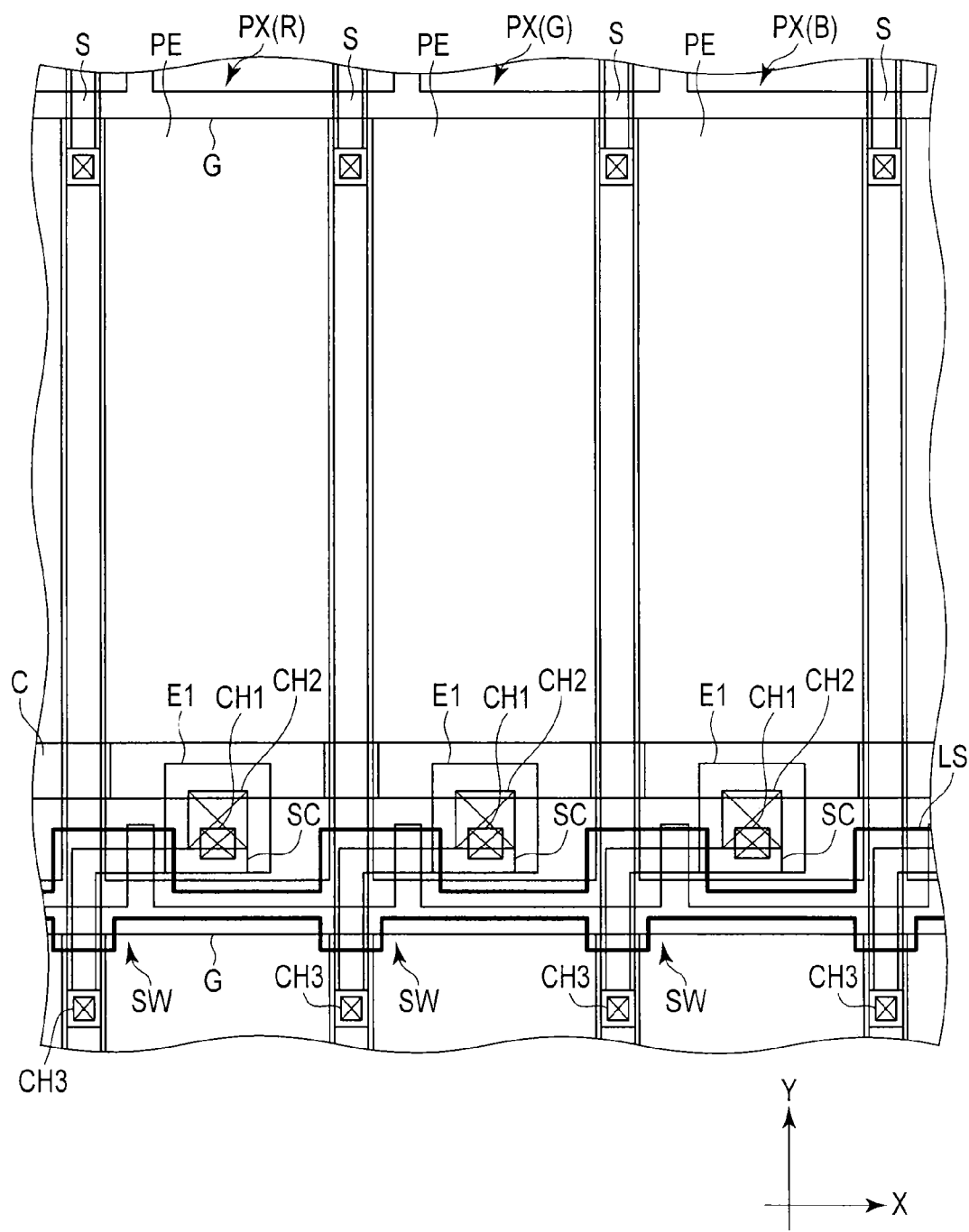
FIG. 6 is a view schematically illustrating another structural example of the active area of the liquid crystal display device of the embodiment.

FIG. 6 is a view schematically illustrating another structural example of the active area of the liquid crystal display device of the embodiment.

In the example, the structure of the pixels PX is different from that of the above-mentioned example. That is, a pixel electrode is disposed between gate lines G arranged in the second direction Y. A storage capacitance line C extends in the direction X between the gate lines G. A drain line SC extends along the source line S to cross the gate line G and expands at the underlayer of the storage capacitance line C to form storage capacitance Ccs. The gate line G diverges to cross the drain line SC at two points.

In the example, the light shielding layer LS is disposed over the even-numbered pixels PX arranged in the direction of the extension of the gate line G at the underlayer of the switching element SW and the gate line G. In a liquid crystal display device of a color display type, when the red coloring layer, green coloring layer, and blue coloring layer are arranged periodically in the first direction X, the light shielding layer LS is disposed over at least six pixels PX arranged in the first direction X.

Furthermore, in two rows of the pixels PX adjacent in the direction of the extension of the source line S, end portions of the light shielding layers are disposed at different positions in the direction of the extension of the gate line G. In other words, the end portions of the light shielding layers LS are arranged not to be adjacent to each other in the second direction Y.

With the light shielding layers LS arranged as in FIG. 6, as with the case of the above-mentioned example, even when a potential variation occurs in the source lines S, a potential variation of the positive polarity signal and a potential variation of the negative polarity signal are superposed on each other in the light shielding layer LS, and thus, the potential variation can be offset to some extent and reduced. Consequently, the variation in the liquid crystal capacitance Clc can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the above-described embodiment, each of the light shielding layers LS is disposed to cross the six source lines S arranged in the first direction X and the light shielding layers LS are arranged along the rows of the pixels arranged in the first direction X; however, each of the light shielding layers LS may be disposed to extend continuously from the one end to the other end of the active area ACT in the first direction X. That is, each of the light shielding layers LS may extend to cross the entire source lines S (S1 to Sm) arranged in the first direction X. Even in that case, the advantage obtained from the above-described embodiment can be achieved as well.

Moreover, the common electrode CE is arranged at the counter substrate CT in the above-described embodiment; however, the common electrode CE may be arranged at the array substrate AR to apply the embodiment to a liquid crystal display device of a type to control alignment of liquid crystal molecules by a lateral electric field (including fringe electric field) generated between a pixel electrode PE and a common electrode CE.

Moreover, in the above-described embodiment, if the column inversion drive scheme is employed as a polarity inversion scheme of the liquid crystal display panel LPN, the inversion of polarity may be performed at every other column of pixels PX or may be performed using three columns of pixels PX of red, green, and blue as a unit. That is, in each frame, signals of different polarity are applied to the source lines S adjacent in the direction of the extension of the gate line G in every other column or in every three columns of red, green, and blue, and the polarity of the signal applied to each of the source line S is inversed in each frame. In either case, the advantage obtained from the above-described embodiment can be achieved as well.

What is claimed is:
1. A liquid crystal display device comprising:
an array substrate comprising a plurality of pixel electrodes arranged in a matrix form, a plurality of gate lines extending along rows in which the plurality of pixel electrodes are arranged, a plurality of source lines extending along columns in which the plurality of pixel electrodes are arranged, a plurality of switching elements, and a plurality of light shielding layers, and each of the switching elements being disposed in proximity to a position where one of the gate lines and one of the source lines cross each other, and the light shielding layers being arranged at an underlayer of the switching elements;
a counter substrate comprising a common electrode opposite to the pixel electrodes; and
a liquid crystal layer held between the array substrate and the counter substrate,
wherein
each of the light shielding layers extends to cross, among the source lines, even-numbered source lines arranged in a direction of extension of the gate lines,
the light shielding layers are arranged in a direction of the extension of the gate lines at first intervals and arranged in a direction of extension of the source lines at second intervals, and
among the light shielding layers, light shielding layers adjacent to each other in the direction of the extension of the source lines have end portions which are shifted from each other in the direction of the extension of the gate lines.

2. The liquid crystal display device of claim 1, wherein the even-numbered source lines are structured by one or more first source lines and second source lines as many as the first source lines, and the first source lines are source lines to which a positive polarity signal is applied during a predetermined horizontal period of each frame, and the second source lines are source lines to which a negative polarity signal is applied during the predetermined horizontal period of each frame.

3. The liquid crystal display device of claim 2, wherein each of the light shielding layers is arranged at an underlayer of the gate lines and extends substantially in parallel with the gate lines.

4. The liquid crystal display device of claim 3, wherein the counter substrate further comprises color filter including a plural kinds of coloring layers, and each of the light shielding layers is disposed over an area opposite to even-numbered periods of the coloring layers arranged periodically.

5. The liquid crystal display device of claim 2, wherein the counter substrate further comprises color filter including a plural kinds of coloring layers, and each of the light shielding layers is disposed over an area opposite to even-numbered periods of the coloring layers arranged periodically.

6. The liquid crystal display device of claim 1, wherein each of the light shielding layers is arranged at an underlayer of the gate lines and extends substantially in parallel with the plurality of gate lines.

7. The liquid crystal display device of claim 1, wherein the counter substrate further comprises color filter including a plural kinds of coloring layers, and each of the light shielding layers is disposed over an area opposite to even-numbered periods of the coloring layers arranged periodically.

8. The liquid crystal display device of claim 1, wherein, among the source lines, signals of different polarity are applied to source lines adjacent to each other in the direction of the extension of the gate lines in each frame, and the polarity of signal applied to each of the source lines is inversed frame by frame.

* * * * *